(12) United States Patent
Chen et al.

(10) Patent No.: US 6,248,991 B1
(45) Date of Patent: Jun. 19, 2001

(54) SEQUENTIAL CORRELATED DOUBLE SAMPLING TECHNIQUE FOR CMOS AREA ARRAY SENSORS

(75) Inventors: Zhiliang Julian Chen, Plano; Eugene G. Dierschke, Dallas, both of TX (US)

(73) Assignee: Texas Instruments Incorporated, Dallastx, TX (US)

( * ) Notice: Subject to any disclaimer, the term of this patent is extended or adjusted under 35 U.S.C. 154(b) by 0 days.

(21) Appl. No.: 09/223,165

(22) Filed: Dec. 30, 1998

Related U.S. Application Data
(60) Provisional application No. 60/070,082, filed on Dec. 31, 1997.

(51) Int. Cl.[7] .................................................. H01L 27/146
(52) U.S. Cl. ................... 250/208.1; 250/214 A; 348/300; 348/308
(58) Field of Search .......................... 250/208.1, 214 R, 250/214 A, 214.1; 327/94, 95; 348/241, 300, 301, 308; 257/290, 291, 292, 293

(56) References Cited

U.S. PATENT DOCUMENTS

| | | | |
|---|---|---|---|
| 5,872,470 | * 2/1999 | Mallinson et al. | 327/94 |
| 5,955,753 | * 9/1999 | Takahashi | 257/292 |
| 5,969,758 | * 10/1999 | Saur et al. | 348/241 |
| 6,008,486 | * 12/1999 | Stam et al. | 250/208.1 |
| 6,040,592 | * 3/2000 | McDaniel et al. | 257/292 |
| 6,040,593 | * 3/2000 | Park | 257/292 |

OTHER PUBLICATIONS

Mangelsdorf et al., "A CMOS Front–End for CCD Cameras," Session 11/Electronic Imaging Circuits/Paper FA 11.5, p. 186, pp. 189–191. (no date provided).

Fossum, "CMOS Image Sensors: Electronic Camera–On–A–Chip,"*IEEE Transactions on Electron Devices*, vol. 44, No. 10, Oct. 1997, pp. 1689–1698.

Reynolds et al., "An Integrated 12 Bit Analog Front End for CCD Based Image Processing Applications," 1996 Symposium on VLSI Circuits Digest of Technical Papers, pp. 96–97.

Kosonocky et al., "Low–Bias CTIA Multiplexer for 1024–Element in GaAs Line Sensors," *Infrared Readout Electronics II* (*1994*), vol. 2226, pp. 152–171.

\* cited by examiner

*Primary Examiner*—John R. Lee
(74) *Attorney, Agent, or Firm*—J. Dennis Moore; W. James Brady, III; Frederick J. Telecky, Jr.

(57) ABSTRACT

A CMOS area array sensor with reduced fixed pattern noise. Device threshold voltage variations are minimied using a Sequential Correlated Double Sampling technique in a column circuitry.

37 Claims, 3 Drawing Sheets

SEQUENTIAL CORRELATED DOUBLE SAMPLING TECHNIQUE FOR CMOS AREA ARRAY SENSORS

This application claims priority under 35 USC § 119(e)(1) of provisional application numbers 60/070,082 filed Dec. 31, 1997.

CROSS-REFERENCE TO RELATED APPLICATIONS

The present application has some Figures in common with, but is not necessarily otherwise related to, the following application(s), which have common ownership and common effective filing dates with the present application:
"Mismatch Independent Reset Sensing for CMOS Area Array Sensors" U.S. patent application Ser. No. 60/070,223 filed Dec. 31, 1997
"Fast Frame Readout Architecture for Array Sensors with Integrated Correlated Double Sampling System" U.S. patent application Ser. No. 60/070,083 filed Dec. 31, 1997;
all of which are herein incorporated by reference.

BACKGROUND AND SUMMARY OF THE INVENTION

This application is related to CMOS imaging sensors.

Background: CMOS Imagers

For the past 20 years or so, the field of optical sensing has been dominated by the charged couple device ("CCD"). However, CCD sensors have a number of problems associated with their manufacture and use. CCD imagers require a special manufacturing process which is incompatible with standard CMOS processing. Thus CCD imagers cannot be integrated with other chips that provide necessary support functions, but require independent support chips to perform, for example, CCD control, A/D conversion, and signal processing. The operation of a CCD imager also requires multiple high voltage supplies varying from, e.g. 5V to 12V. The higher voltages produce higher power consumption for CCD devices. Consequently, costs for both the CCD image sensor and ultimately the system employing the sensor, remain high.

The recent advances in CMOS technology have opened the possibility of imagers offering significant improvements in functionality, power, and cost of, for example, digital video and still cameras. Advances in chip manufacturing processes and reductions in supply voltages have encouraged revisitation of CMOS technology for use in image sensors. The advent of submicron CMOS technology allows pixels which contain several FETs, and are circuits in their own right, to be comparable in size to those existing on commercial CCD imagers. Fabrication on standard CMOS process lines permits these imagers to be fully integrated with digital circuitry to create single-chip camera systems. A CMOS area array sensor (or CMOS imager) can be fabricated with other system functions, e.g. controller, A/D, signal processor, and DSP. Hence, the cost of the CMOS process is more economical than that of the CCD process. CMOS imagers can operate with a single low supply voltage, e.g. 3.3V or 5V. This provides lower power consumption than CCD imagers.

Background: Fixed Pattern Noise

One significant disadvantage with CMOS imagers has previously limited their widespread application—Fixed Pattern Noise ("FPN"). FPN is a built-in characteristic of X-Y addressable devices and is particularly an issue with any sort of CMOS imaging chips. FPN is noise that appears in a fixed pattern because the noise level is related to the position of the pixel in the array, the geometry of the column bus, and the proximity of other noise sources. (In addition, there is purely random noise not correlated to the pixel position, but due to inherent characteristics of the detector.) The effect of FPN is like viewing a scene through a window made of photo negatives. FPN occurs when process limitations produce device mismatches and/or non-uniformities of the sensor during fabrication on a wafer. FPN consists of both pixel FPN and column FPN. Each pixel circuit comprises at least a photodiode and a sensing transistor (operating as source-follower) as shown in FIG. 3. Mismatches of the sensing transistor between pixels may produce different output levels for a given input optical signal. The variations of these output levels is called pixel FPN. Additionally, each column (or row) has separate read circuitry. Driver mismatches between different columns (or rows) produce column FPN. Most device mismatches are caused by threshold voltage ($V_T$) mismatches among CMOS transistors across the wafer.

A conventional solution for FPN suppression is to use a memory block to store the signal data for a whole frame and to subtract the FPN by sampling a reset voltage for the whole frame. The subtraction is done on a frame-by-frame basis which results in very slow frame rates.

Background: Correlated Double Sampling

Correlated Double Sampling ("CDS") plays an important role in removing several kinds of noise in high-performance imaging systems. Basically, two samples of the sensor output are taken. First, a reference sample is taken that includes background noise and noise derived from a device mismatch. A second sample is taken of the background noise, device mismatch, and the data signal. Subtracting the two samples removes any noise which is common (or correlated) to both, leaving only the data signal. CDS is discussed in greater detail in the following paper by Chris Mangelsdorf, Analog Devices, Inc., 1996 IEEE International Solid-State Circuits Conference, and is herein incorporated by reference.

Sequential Correlated Double Sampling Technique for CMOS Area Array Sensors

The present application discloses a technique which suppresses FPN in a CMOS image sensor. The technique uses an integrated Sequential Correlated Double Sampling ("SCDS") architecture to suppress both pixel and column FPN during pixel readout, and demonstrates that the FPN level can be reduced to 0.2 mV—essentially the same FPN level of CCD technology. In general, in a CDS architecture, a pixel sensing NMOS transistor (as shown in FIG. 3) performs double sampling. First, the photodiode voltage is sensed. Then a known, fixed voltage, e.g. $V_{RES}$, is sensed. Subtraction is then performed to suppress the mismatch effect caused by the pixel sensing NMOS transistor threshold variations across the wafer. Whereas conventional schemes incorporate the slower frame-subtraction method to suppress FPN, the innovative technique performs FPN suppression sequentially on a faster pixel-by-pixel and column-by-column basis.

An advantage is that the SCDS technique uses a maximum of five clock cycles (five steps—Table I) for every pixel and column read cycle, whereas conventional methods utilize two to three times the number of clock cycles to perform the same function. The innovative method performs both readouts sequentially (pixel first, then column)

enabling a faster readout rate (number of pixels per second). This method simplifies system design, and reduces power consumption, and ultimately, system cost. Another advantage is that the readout and comparison function is performed internal to the basic sensor whereas conventional methods require extra circuitry to perform the comparison function. Another advantage is that CMOS technology allows imaging support functions to be integrated onto a single chip. Another advantage is that the innovative SCDS technique significantly improves suppression of FPN in CMOS imagers (amounting to approximately $\frac{1}{25}$–$\frac{1}{20}$ the level attained without the use of SCDS) encouraging widespread application of CMOS imagers.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Conventional Arrays

Figure 2:
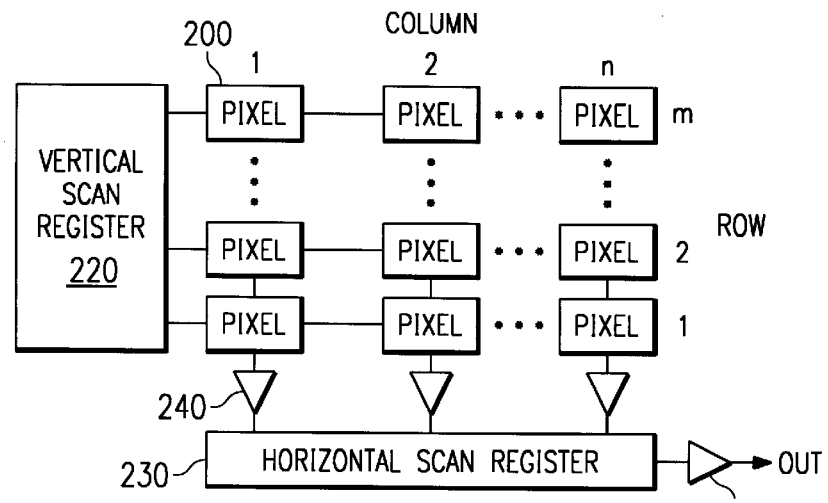
FIG. 2 shows a typical CMOS area array of m pixels×n columns.

FIG. 2 shows a typical array of pixel circuits with readout support circuitry. In this CMOS imager, each pixel block comprises a photosensitive diode or other junction device which converts photons into charge. Pixel block 200 represents a single pixel block in an array of pixel blocks (n columns×m rows). Column amplifier block 240 is one of an array of column amplifiers and/or drivers that provide the interface from the column of individual pixel blocks 200 to the chip output buffer/amplifiers block 280. Horizontal and vertical scan registers (230 and 220) transfer the pixel signals onto the readout lines. The signal is amplified for use by later circuitry.

Two different types of sensors can be realized in CMOS technology. These are passive and active pixel sensors. The difference between these two types is that a passive pixel does not perform signal amplification whereas an active pixel does. A passive-pixel sensor is simply a photodiode (MOS or p-n junction diode) with a transistor that passes photoelectrically generated signal charge to an amplifier outside of the pixel array (a sensing transistor, e.g. N1 is not present in a passive pixel circuit).

Figure 3:
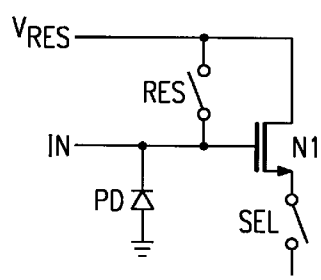
FIG. 3 shows a typical pixel circuit.

FIG. 3 shows a typical active-pixel sensor circuit. The gate of transistor N1 is connected to a reset switch RES and the cathode of a photodiode PD. Initially, the reset switch RES is closed and the voltage at node IN approximates the reset voltage $V_{RES}$. A finite charge exists at node IN which is dependent on the voltage $V_{RES}$, and the capacitances of both the photodiode PD and gate of the NMOS transistor N1. When switch RES is opened, the photodiode current causes the charge at node IN to be discharged, and the voltage at node IN decreases. After a fixed integration time, the voltage at node IN drops to $V_{PD}$, the voltage of the photodiode. Switch SEL (in conjunction with NMOS transistor N1) is used to read the voltage at node IN.

Sequential CDS Architecture

Figure 1:
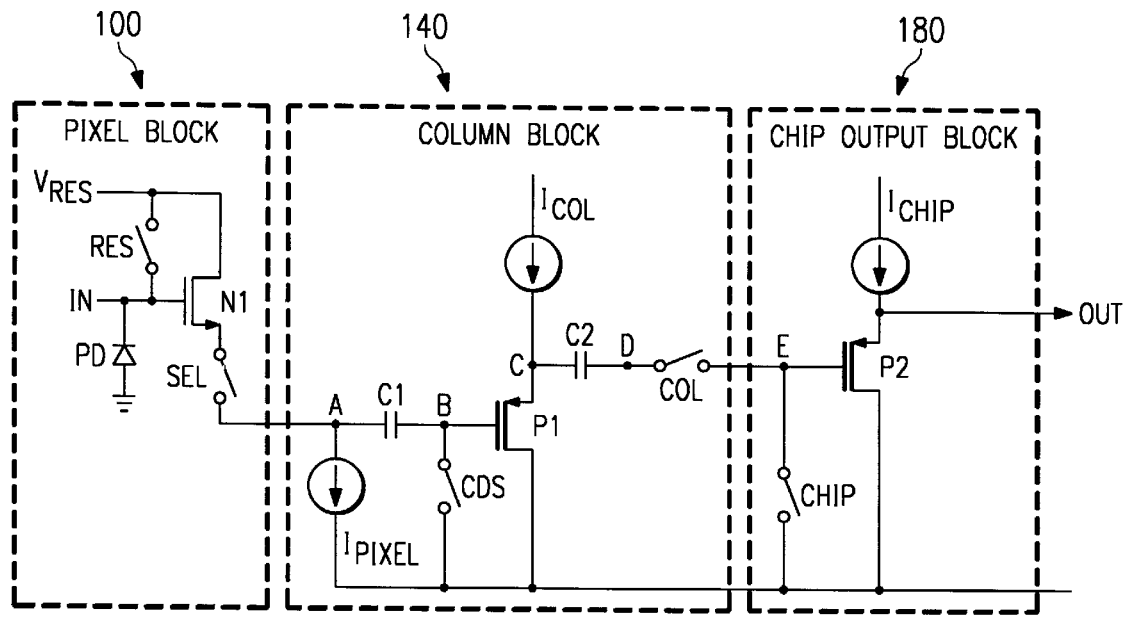
FIG. 1 shows a preferred embodiment of the innovative circuit which uses the innovative readout method.

FIG. 1 shows a preferred embodiment of the innovative circuit which uses the disclosed technique. The following discussion centers around a single pixel read operation, but it should be understood that a typical sensor comprises numerous pixel circuits in an array, as shown in FIG. 2. The principal blocks are the pixel block 100, the column block 140, and chip output block 180.

The primary components of the column block 140 (one for each column of pixels) are capacitors C1 and C2, PMOS transistor P1, switches CDS and COL, and current sources $I_{PIXEL}$ and $I_{COL}$. The chip output block 180 (one circuit for the whole chip) comprises, in this example, a PMOS transistor P2, a switch CHIP, and a current source $I_{CHIP}$. Typical approximate device parameters in a 0.6 micron process are the following: capacitors C1 and C2 range from 1–4 pF; current source values are 5–10 microamps for $I_{PIXEL}$, 20–100 microamps for $I_{CHIP}$, and 10–100 microamps for $I_{COL}$; sizes for transistors P1 and P2 50/0.6; transistor N1 approximates 2/0.6; and transistor RES approximates 1.25/0.6.

Opening switch SEL allows the column block circuitry 140 and chip output block circuitry 180 to be used for readout of signals from other pixels during the instant pixel's integration period.

At the start of the integration period, switch RES is closed and the voltage at node IN approximates the reset voltage $V_{RES}$. Next, opening switch RES begins the integration period, and allows current from the photodiode PD to remove charge from input node IN, thus decreasing the voltage at node IN from $V_{RES}$ to $V_{PD}$.

In Step 1, switches CDS, COL, and CHIP are closed. Closing switches CDS, COL, and CHIP initializes both the column block circuitry 140 and chip block circuitry 180 in preparation for the first readout of the charge at input node IN. The voltage across capacitor C1 approximates zero (current source $I_{PIXEL}$ removes any charge from capacitor C1) when switch CDS is open, and the voltage across C2 is $V_{gsP1}$ (the gate-to-source voltage of PMOS transistor P1). The voltage at the output OUT is low (at $V_{gsP2}$).

Step 2 begins by closing switch SEL and opening switch COL. Closing switch SEL couples the voltage developed at input node IN to the column block circuitry 140. With switch CDS still closed, capacitor C1 charges. The voltage across C1 becomes $V_{PD}-V_{gsN1}$ (where $V_{gsN1}$ is the gate-to-source voltage of NMOS transistor N1, and $V_{PD}$ is the voltage at node IN at the end of the integration period). The voltage across C2 remains at $V_{gsP1}$. The voltage at the output OUT remains at a low level ($V_{gsP2}$).

In Step 3, switches CDS and CHIP are then opened. Nodes B and E are now floating (or more precisely, not actively driven). The voltage across C1 remains $V_{PD}-V_{gsN1}$ and the voltage across C2 remains at $V_{gsP1}$. The voltage at the output OUT remains at a low level ($V_{gsP2}$). The column block circuit 140 is now ready to read the reference voltage $V_{RES}$. Note that both capacitors C1 and C2 are required for cancellation of the device threshold variations. Capacitor C1 cancels per-pixel $V_T$ variations, and capacitor C2 cancels variations in column amplifiers.

In Step 4, switches RES and COL are then closed. Closing switch RES while switch SEL is closed initiates sampling of the reference voltage $V_{RES}$ by the column block circuitry 140. The source voltage of transistor N1 becomes $V_{RES}-V_{gsN1}$. The voltage across C1 remains at $V_{PD}-V_{gsN1}$. Thus the gate voltage of transistor P1 rises to the difference of the reference voltage and the data signal voltage, and becomes $(V_{RES}-V_{gsN1})-(V_{PD}-V_{gsN1})=V_{RES}-V_{PD}$. The source voltage of transistor P1 becomes $(V_{RES}-V_{PD})-V_{gsP1}$ (since this is a P-channel device, voltage $V_{gsP1}$ is a negative value). The voltage across C2 remains $V_{gsP1}$. Thus the gate voltage of transistor P2 becomes $(V_{RES}-V_{PD})-V_{gsP1}+V_{gsP1}=V_{RES}-V_{PD}$, the voltage difference between the reference voltage and the data signal voltage. The readout voltage OUT is $V_{RES}-V_{PD}+V_{gsP2}$, where $V_{gsP2}$ is the gate-to-source voltage of PMOS transistor P2. Transistor P2 is a common device used for the readout of all pixels, but the chip output block circuitry 180 covers a wide variety of output circuits and may comprise a number of other techniques, e.g. differential amplifier circuits, linear circuitry, or any type of driver circuits for outputting the data from the chip.

Both $V_{gsN1}$ and $V_{gsP1}$ terms are canceled using the SCDS technique. Additionally, the $V_T$ term of both transistors N1 and P1, which are embedded in $V_{gsN1}$ and $V_{gsP1}$, are not present in the above equation. Thus the effect of CMOS threshold voltage mismatches are significantly suppressed with the disclosed innovative technique and FPN is reduced substantially.

Lastly, in Step 5, switch CHIP is closed and all other switches are opened. The voltage difference of $V_{RES}$ and $V_{PD}$ at the gate of P is pulled to a low state leaving the readout voltage OUT equal to $V_{gsP2}$. Opening switches RES and SEL resets the pixel circuit for the next integration period. The system is ready for the next pixel readout. During the integration period of the present pixel (used in this example), the column 140 and chip output 180 blocks are being used for the readout of other pixels.

The following Table I summarizes all switch positions during the integration period and pixel readout.

| Switch | RES | SEL | CDS | COL | CHIP |
|---|---|---|---|---|---|
| Integration Period | O | O | x | x | x |
| Readout Step 1 | O | O | C | C | C |
| Readout Step 2 | O | C | C | O | C |
| Readout Step 3 | O | C | O | O | O |
| Readout Step 4 | C | C | O | C | O |
| Readout Step 5 | O | O | O | O | C |
| Ready for next Pixel readout | | | | | |

(O = open, C = closed, x = don't care)

For the first order approximation, $V_{gsN1}$ and $V_{gsP1}$ depend primarily on the biased currents of $I_{PIXEL}$ and $I_{COL}$. However, $V_{gsN1}$ and $V_{gsP1}$ also are functions of drain voltages and backgate voltages. Although the SCDS technique cannot cancel all of the pattern noise, the technique provides an innovative way to significantly suppress it.

In a passive pixel arrangement, sensing transistor N1 is not present. Additionally, the capacitor C1 and current source $I_{PIXEL}$ are also not present. However, transistor RES is present.

Figure 4:
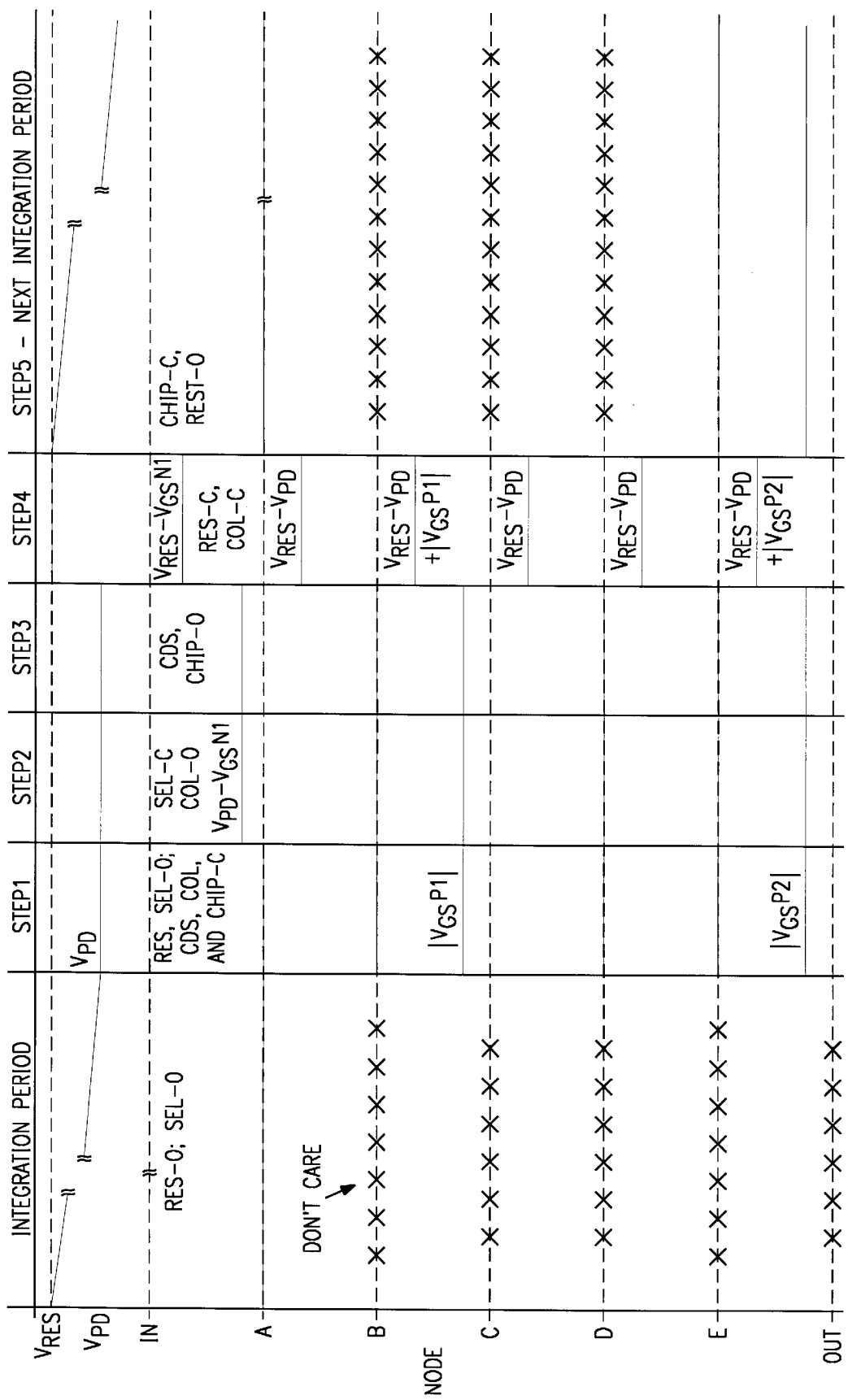
FIG. 4 shows a timing diagram of voltages at the various nodes designated in FIG. 1 during the integration and readouts phases.

FIG. 4 shows a timing diagram of voltages at the various nodes designated in FIG. 1 during the integration and readout phases.

The following Table II lists the simulated pixel readout, with and without the SCDS technique, for transistor N1 threshold voltage, $V_T$, variations in Texas Instrument's ("TI's") 33A21 process (0.6 micron, double-poly, triple-level metal).

| $V_T$ variation (mV) | +50 | +20 | +6 | 0 | −6 | −20 | −50 |
|---|---|---|---|---|---|---|---|
| Readout variation without SCDS (mV) | +42 | +16.7 | +5 | 0 | −5.1 | −16.8 | −41.8 |
| Readout variation with SCDS (mV) | +1.7 | +0.7 | +0.2 | 0 | −0.18 | −1 | −3 |

The following Table III presents simulated pixel readout voltages for both transistor N1 and transistor P1 threshold voltage $V_T$ variations in TI's 50BP21 process (0.72 micron, double-poly, triple-level metal).

| $V_T$ variation (mV) | +20 | +10 | +5 | 0 | −5 | −10 | −20 |
|---|---|---|---|---|---|---|---|
| Readout variation caused by N1 (mV) | +1.2 | +0.6 | +0.2 | 0 | −0.2 | −0.7 | −1.2 |
| Readout variation caused by P1 (mV) | +0.03 | +0.01 | +0.005 | 0 | −0.005 | −0.01 | −0.03 |

The simulation results clearly show that the SCDS technique suppresses FPN to about 1/25–1/20 of that without the SCDS technique. In these two processes, the $V_T$ variation in a wafer is approximately 5–6 mV. Therefore, the FPN could be as low as 0.2 mV, if the SCDS technique is applied.

Imaging Chip

Figure 5:
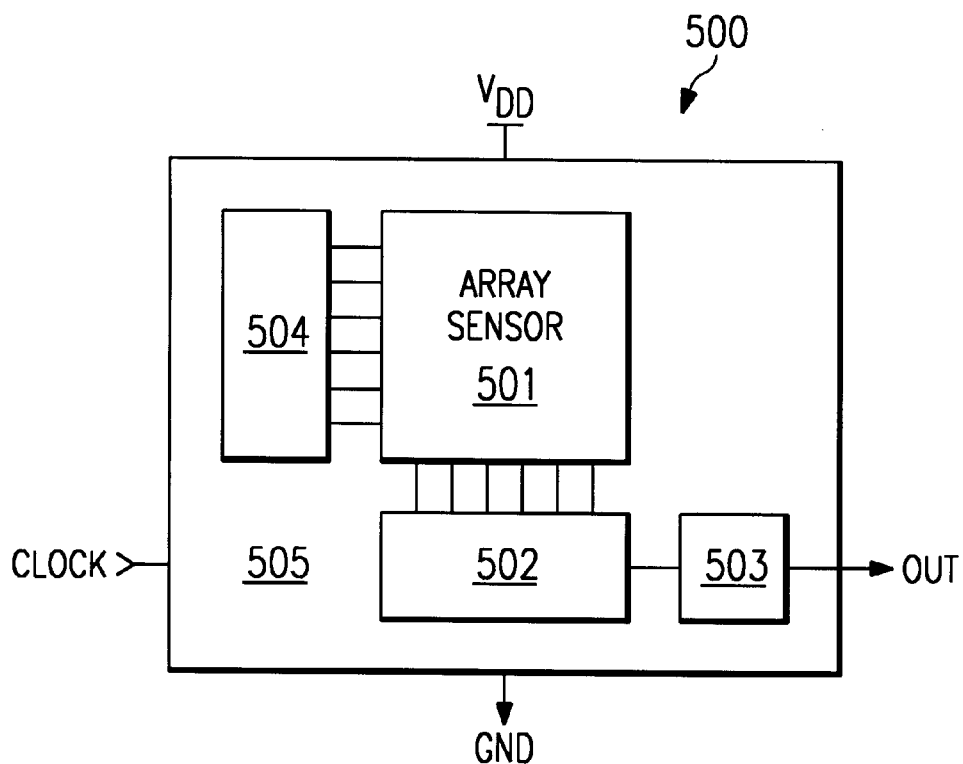
FIG. 5 shows an imager chip comprising the innovative sampling architecture.

FIG. 5 shows an imager chip comprising the innovative sampling architecture. The chip 500 incorporates a row select circuitry 504 and column select circuitry 502 to read the array sensor 501. The output circuitry 503 receives pixel data from the column circuitry 502 and presents it to the output terminal OUT. Additional support circuitry may be fabricated in the peripheral region 505. The chip 500 also has connections for supply voltage VDD, ground GND, and clocking signals CLOCK.

A Camera System Using the Imaging Sensor Chip

Figure 6:
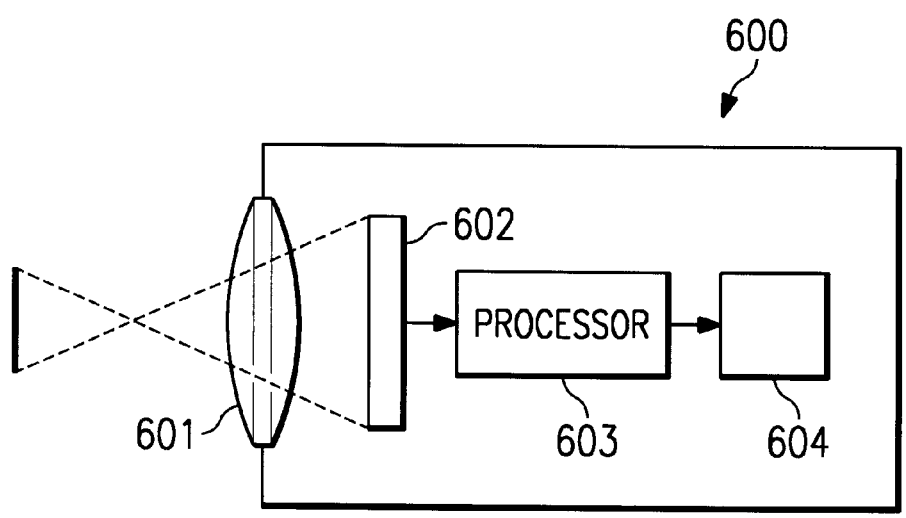
FIG. 6 shows an integrated circuit imaging chip using the innovative readout architecture designed into a camera.

FIG. 6 shows an integrated circuit imaging chip using the innovative readout architecture designed into a camera. The camera 600 has a lens 601 which focuses an image onto the image sensor chip 602. A processor 603 receives the data from the image chip 602 and sends it to a storage and output system 604.

Alternative Embodiment: Op-Amp Implementation

According to a disclosed class of innovative embodiments, the column amplifier of the column block circuit, e.g., column amplifier block 240 (FIG. 2) may compose operational amplifiers.

According to a disclosed class of innovative embodiments, there is provided: A pixel-sensing MOS integrated circuit, comprising: an array of pixel circuits each performing an illumination-sensing operation; a plurality of column amplifying circuits each connected to read said pixel circuits from a column of said array; wherein said column amplifying circuit performs a correlated double sampling operation through a single path, and comprises at least one storage device for cancelling variations of said pixels; and an output circuit. According to another disclosed class of innovative embodiments, there is provided: A pixel-sensing MOS integrated circuit, comprising: an array of pixel circuits each performing an illumination-sensing operation; a column amplifying switching means connected to read said pixel circuits therein; wherein said column amplifying switching means is configured to clock signal and noise levels from said pixel circuit through a single path to perform cancellation of circuit variations, and performs a correlated double sampling operation; and an output circuit.

According to another disclosed class of innovative embodiments, there is provided: A pixel-sensing MOS integrated circuit imager, comprising: one of a plurality of pixel circuits each comprising a sensing transistor; a column selecting circuit comprising an amplifying transistor; wherein said column selecting circuit sequentially connects to ones of said pixel circuits to perform correlated double sampling, and reads first and second voltages therefrom; wherein said column selecting circuit comprises first and second storage devices; wherein the effects from threshold voltage mismatches of both said sensing transistor and said column transistor are minimized; and an output driver circuit; wherein the difference in said voltages is presented at an output terminal through said output driver circuit; whereby fixed pattern noise is substantially minimized.

According to another disclosed class of innovative embodiments, there is provided: A photosensing imaging system, comprising: a focusing element; a pixel-sensing MOS integrated circuit imager receiving light from said focusing element, and comprising: an array of pixel circuits each performing an illumination-sensing operation; a plurality of column amplifying circuits each connected to read said pixel circuits from a column of said array; wherein said column amplifying circuit performs a correlated double sampling operation through a single path, and comprises at least one storage device for cancelling variations of said pixels; and an output circuit; a processor connected to control said imager; and a storage medium for receiving and storing data from said imager.

According to another disclosed class of innovative embodiments, there is provided: A low-noise method of sampling pixel and column circuits in a CMOS area array sensor, comprising the steps of: receiving a first voltage at a first node of said pixel circuit; wherein said voltage is generated by a photosensitive circuit and received at a control terminal of a first active device; initializing said column circuit and an output circuit in preparation for reading said pixel circuit; wherein said column circuit comprises first and second storage circuits, and a second active device; reading into said column circuit, said voltage at said first node of a selected pixel; wherein the voltage on said first storage circuit rises to a first level; stabilizing said first and second storage circuits in preparation for reading a second voltage into said column circuit; reading a second voltage from said pixel circuit; wherein the difference of said voltages is derived, and said differencing operation substantially subtracts out threshold voltage variations between said first and second active devices; and transferring said voltage difference to an output node of said output circuit; whereby said sampling method is performed in no more than 5 clocking cycles.

According to another disclosed class of innovative embodiments, there is provided: A low-noise method of sampling pixel and column circuits in a CMOS area array sensor, comprising the steps of: reading a pixel signal from a pixel circuit; reading a noise signal from said pixel circuit; and sequentially offsetting said pixel and noise signals a capacitor to minimize device variations and noise.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, as will be obvious to those of ordinary skill in the art, other circuit elements can be added to, or substituted into, the specific circuit topologies shown.

For another example, within the constraints well-known to those of ordinary skill, nonlinear devices can be added in series with (or used to replace) resistors, to increase the impedance of load devices.

For another example, within the constraints well-known to those of ordinary skill, a variety of well-known output driver configurations can be substituted for those shown.

For another example, within the constraints well-known to those of ordinary skill, two or even four column blocks may be implemented for the column readout circuitry.

For another example, within the constraints well-known to those of ordinary skill, the innovative sampling method and structures can also be adapted to linear array configurations.

For another example, within the constraints well-known to those of ordinary skill, the innovative sampling method and structures are easily adaptable to passive-pixel array configurations.

What is claimed is:

1. A pixel-sensing MOS integrated circuit, comprising:
an array of pixel circuits each performing an illumination-sensing operation to provide a pixel signal;
a plurality of column amplifying circuits each connected to read said pixel circuits from a column of said array; wherein said column amplifying circuit performs a correlated double sampling operation on said pixel signals from said column through a single path, and comprises at least one storage device for cancelling variations of said pixel signals; and
an output circuit.

2. The integrated circuit of claim 1, wherein said pixel circuits are of an active-pixel architecture.

3. The integrated circuit of claim 1, wherein said amplifying circuit comprises a PMOS transistor.

4. The integrated circuit of claim 1, wherein said amplifying circuit comprises an operational amplifier.

5. The integrated circuit of claim 1, wherein said storage device is a capacitor.

6. The integrated circuit of claim 1, wherein said amplifying circuit reads said pixel circuits individually.

7. The integrated circuit of claim 1, wherein said variations comprise pixel-sensing transistor threshold voltages variations, and column amplifier variations.

8. The integrated circuit of claim 1, wherein a reset voltage, and a photodiode voltage is read from said pixel circuit.

9. The integrated circuit of claim 1, wherein said output circuit comprises a PMOS transistor.

10. A pixel-sensing MOS integrated circuit, comprising:
an array of pixel circuits each performing an illumination-sensing operation to provide a pixel signal;
a column amplifying switching means connected to read said pixel circuits in a column of said array; wherein said column amplifying switching means is configured to clock signal and noise levels from said pixel circuits of said column through a single path to perform cancellation of circuit variations, and performs a correlated double sampling operation; and
an output circuit.

11. The integrated circuit of claim 10, wherein said pixel circuits are of an active-pixel architecture.

12. The integrated circuit of claim 10, wherein said amplifying switching means comprises a PMOS transistor.

13. The integrated circuit of claim 10, wherein said amplifying switching means comprises an operational amplifier.

14. The integrated circuit of claim 10, wherein said storage devices are capacitors.

15. The integrated circuit of claim 10, wherein said amplifying switching means reads said pixel circuits individually.

16. The integrated circuit of claim 10, wherein said amplifying switching means reads a column of said pixel circuits individually.

17. The integrated circuit of claim 10, wherein said cancelled variations comprise pixel-sensing transistor threshold voltages variations, and column amplifier variations.

18. The integrated circuit of claim 10, wherein said read operation comprises first, a reset voltage, and second, a photodiode voltage.

19. The integrated circuit of claim 10, wherein said output circuit comprises a PMOS transistor.

20. A pixel-sensing MOS integrated circuit, comprising:
one of a plurality of pixel circuits providing a signal having a voltage, each pixel circuit comprising a sensing transistor;
a column selecting circuit comprising an amplifying transistor; wherein said column selecting circuit sequentially connects to ones of said pixel circuits to perform correlated double sampling on said signal voltage by reading first and second voltages therefrom; wherein said column selecting circuit comprises first and second storage devices; wherein the effects from threshold voltage mismatches of both said sensing transistor and said column transistor are minimized; and
an output driver circuit coupled to said column selecting circuit and providing the difference in said voltages at an output terminal;
whereby fixed pattern noise is substantially minimized.

21. The integrated circuit of claim 20, wherein said amplifying transistor is a PMOS transistor.

22. The integrated circuit of claim 20, wherein said storage devices are capacitors.

23. The integrated circuit of claim 20, wherein said column selecting circuit reads said pixel circuits individually.

24. The integrated circuit of claim 20, wherein said column selecting circuit reads a column of said pixel circuits individually in sequence.

25. The integrated circuit of claim 20, wherein said first voltage is a reset voltage, and said second voltage is a photodiode voltage.

26. The integrated circuit of claim 20, wherein said output circuit comprises a PMOS transistor.

27. A photosensing imaging system, comprising:
an imager, comprising
a focusing element,
a pixel-sensing MOS integrated circuit imager receiving light from said focusing element, and comprising,
an array of pixel circuits each performing an illumination-sensing operation to provide a pixel signal,
a plurality of column amplifying circuits each connected to read said pixel circuits from a column of said array; wherein said column amplifying circuit performs a correlated double sampling operation on said pixel signals through a single path and providing resultant pixel data, and comprises at least one storage device for canceling variations of said pixel signals, and
an output circuit;
a processor connected to control said imager; and
a storage medium for receiving and storing said pixel data from said imager.

28. The system of claim 27, wherein said pixel circuits are of an active-pixel architecture.

29. The system of claim 27, wherein said pixel circuits are of a passive-pixel architecture.

30. The system of claim 27, wherein said storage device is a capacitor.

31. The system of claim 27, wherein said column amplifying circuits each read said pixel circuits individually.

32. The system of claim 27, wherein said column amplifying circuits each read a column of said pixel circuits individually.

33. A low-noise method of sampling pixel circuits, each pixel circuit providing a signal having a voltage, said pixel circuits being arranged in columns in a CMOS area array sensor, comprising the steps of:
(a.) receiving a first voltage at a first node of said pixel circuit, wherein said first voltage is generated by a photosensitive circuit and received at a control terminal of a first active device that communicates said first voltage to a second terminal of said first active device;
(b.) initializing said a column circuit associated with a column of pixel circuits and an output circuit in preparation for reading said pixel circuits, wherein said column circuit comprises first and second storage circuits, and a second active device for amplifying a signal applied thereto and providing an amplified signal as an output signal of said column circuit, wherein said first and second storage circuits cooperate with said first and second active devices to modify said output signal of said column circuit in accordance with voltages stored on said first and second storage circuits;
(c.) reading into said column circuit, said first voltage at said second terminal of said first active device of a selected pixel in said column, wherein the voltage on said first storage circuit rises to a first level, and storing a compensation voltage on said second storage circuit;
(d.) stabilizing said first and second storage circuits in preparation for reading a second voltage into said column circuit;
(e.) reading a second voltage from said selected pixel circuit and amplifying said second voltage to obtain an output signal of said column circuit whereby through the cooperation of said first and second storage circuits said step of reading and amplifying substantially subtracts out from said column circuit output signal threshold voltage variations between said first and second active devices; and
(f.) transferring said column circuit output signal to an output node of said output circuit;
whereby said sampling method is performed in no more than 5 clocking cycles.

34. The method of claim 33, wherein said pixel circuit is an active pixel circuit.

35. A low-noise method of sampling pixel and column circuits in a CMOS area array sensor, comprising the steps of:
(a.) reading a pixel signal from a pixel circuit;
(b.) reading a noise signal from said pixel circuit; and
(c.) sequentially offsetting said pixel signal with said noise signal in a capacitor to minimize device variations and noise.

36. The method of claim 35, wherein step (a.) is performed before step (b.).

37. The method of claim 35, wherein step (b.) is performed before step (a.).

* * * * *